Sept. 25, 1956     C. R. RICHTER     2,764,230
TORCH
Filed Sept. 2, 1953     2 Sheets-Sheet 1
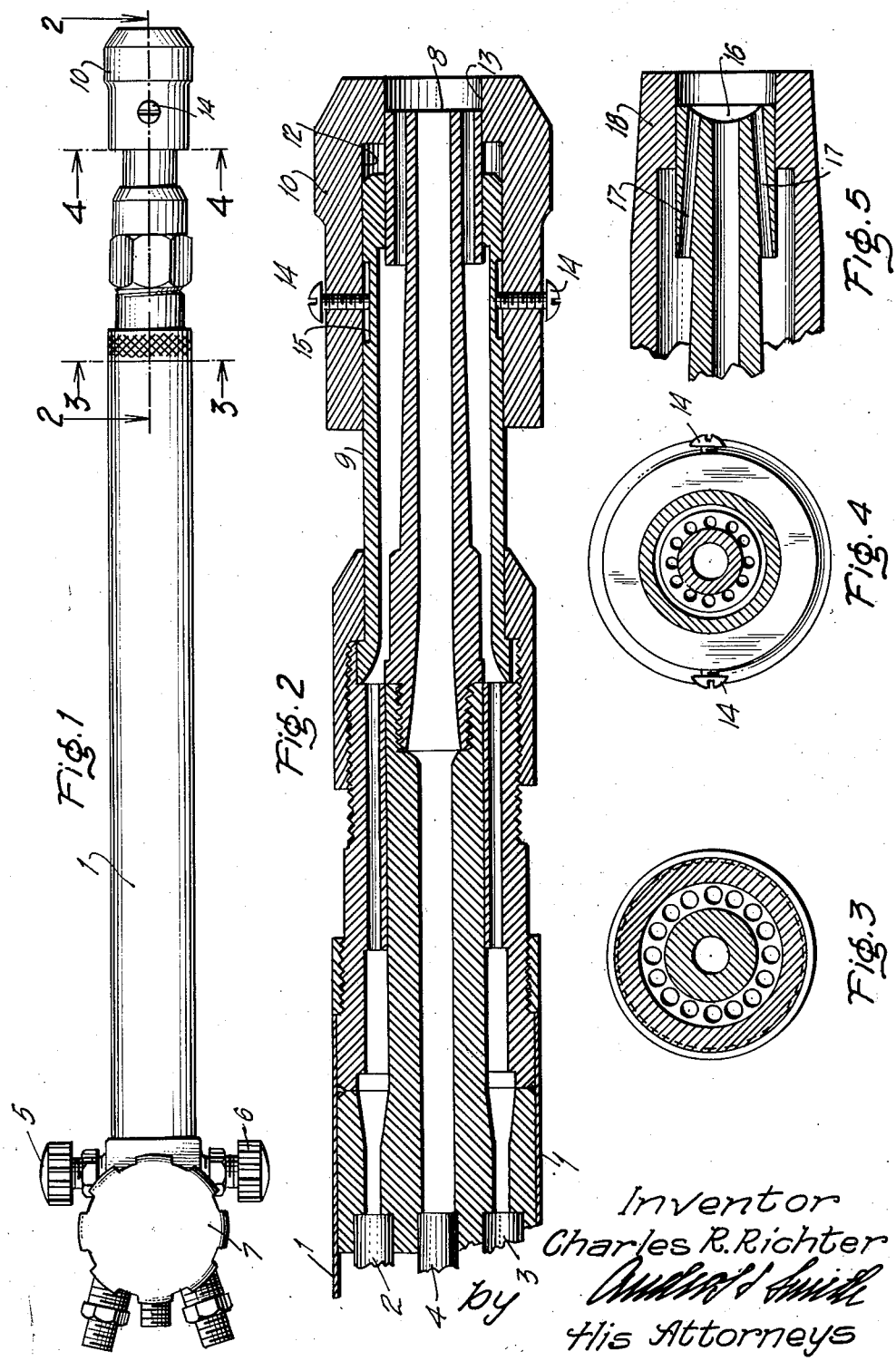
Inventor
Charles R. Richter
by
His Attorneys

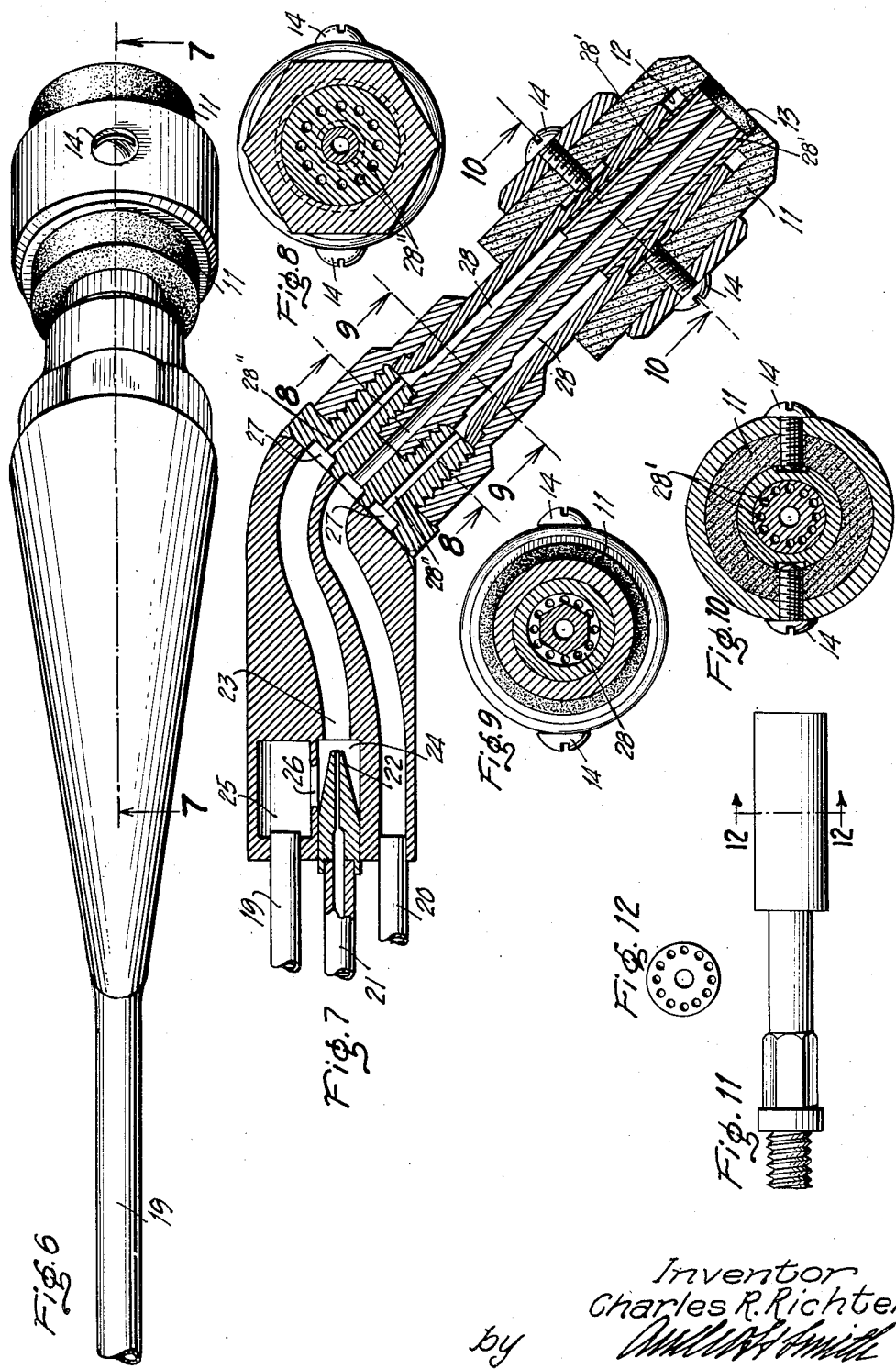

United States Patent Office 2,764,230
Patented Sept. 25, 1956

2,764,230

TORCH

Charles R. Richter, Schenectady, N. Y.

Application September 2, 1953, Serial No. 378,088

3 Claims. (Cl. 158—27.4)

My invention relates to torches for use with gas at either high or low pressure and which are especially adapted for heavy cutting and scarfing operations. It also relates to means for protecting the tip and tip shell from burning where the gas employed must be burned at a very high rate in order to produce the necessary heat when operating on very thick metal sections.

Torches of the present known types are not adapted for cutting and scarfing heavy sections of metal with natural or manufactured gases drawn directly from a source thereof at low pressure of the order existing in city mains because they do not provide the fast melting start and cutting speed that is desired. When cutting heavy sections, hot billets, etc., with gas drawn directly from a source at either high or low pressure, the tip and tip shell of the torch are subjected to tremendous heat which not only causes burning of the tip and shell but results in backfires which are not only dangerous but costly because they interrupt the cutting operation.

One of the objects of my invention is to provide a simple protector for the tip and the external shell thereof which will protect the same when exposed to high temperatures caused both by the preheating flame and the heat radiating from the metal being cut, and prevent backfires and the burning of said tip and shell. Another object is to provide a device of this character which is adjustably connected to the tip shell so that it may be secured thereto with its free end at various distances from the discharge end of the tip to prevent lateral dispersion of the burning gas issuing from the tip. Another object is to provide, in connection with such a protector, a torch tip having a concave discharge end and gas passages which converge towards the discharge end of the tip and further serve to direct the burning gases in a straight-forward direction and, with the protector, concentrate them in a small space. A further object is to provide a torch of such design that it may be used with natural, propane and manufactured gases of a low B. t. u. content for cutting and scarfing heavy sections.

I accomplish these objects by the means described below and illustrated in the accompanying drawings, in which—

Fig. 1 is a plan view of a straight torch embodying my invention;

Fig. 2 is an enlarged section of Fig. 1 in the plane 2—2;

Fig. 3 is an enlarged section of Fig. 1 in the plane 3—3;

Fig. 4 is an enlarged section of Fig. 1 in the plane 4—4;

Fig. 5 is a fragmentary section similar to Fig. 2 showing a modified type of tip;

Fig. 6 is a plan view in which the torch head is angularly disposed;

Fig. 7 is a section of Fig. 6 in the plane 7—7;

Fig. 8 is a section of Fig. 7 in the plane 8—8;

Fig. 9 is a section of Fig. 7 in the plane 9—9;

Fig. 10 is a section of Fig. 7 in the plane 10—10;

Fig. 11 is a plan view of the inner tip of a cutting, scarfing or gouging torch; and Fig. 12 is a section of Fig. 11 in the plane 12—12.

Referring to the drawings and first to Figs. 1–4, inclusive, my torch comprises a tube 1 in which are enclosed tubes 2 and 3 for conveying a combustible gas and oxygen, respectively, to the tip, and a central tube 4 for conveying cutting oxygen to the tip; the flow of said gas and the oxygen to be mixed therewith being controlled by the valves 5 and 6, and the flow of cutting oxygen by the quick-opening valve 7. The discharge end 8 of the tip is illustrated as projecting somewhat beyond the outer tip shell 9. Closely fitted around the external tip shell 9, is my protector 10, which may be formed of cast iron or other refractory metal or material such as shown at 11, in Figs. 6, 7 and 10. The protector is an elongated sleeve or tubular element having a comparatively long portion 12, of an internal diameter adapting it to fit closely around the tip shell 9, and a comparatively short portion 13 of an internal diameter adapting it to fit closely around the tip. Where the device is formed of cast iron or other metal which is highly resistant to heat, it may be adjustably secured to the external tip shell by means of set screws 14. Where these screws contact the shell, the latter is provided with a portion 15 of reduced external diameter so that the protector may be secured to the shell with its free end projecting various distances beyond the discharge end of the tip. Thus, when the protector projects beyond the end of the tip, it serves laterally to confine the flames discharged from said tip and to prevent the lateral dispersion thereof.

In Fig. 5, I have shown a modified form of tip in which the discharge end thereof is concave, as shown at 16, the gas discharge passages 17 adjacent the discharge end of the tip converge toward the axis of the tip, and the protector 18, formed of cast iron or other metal which is resistant to disintegration when subjected to high temperatures, serves as the external shell of the tip and projects beyond the discharge end of the tip, as shown in Fig. 5. Thus, the portion of the protector which projects beyond the discharge end of the tip serves laterally to confine the flames and the converging gas passages and the concave discharge end of the tip serve further to direct the flames towards the axis of the tip. The performance of my torch when used with gases having a low B. t. u. content is excellent when a tip of the type shown in Fig. 5 is used, because it concentrates the burning gases in a smaller space coaxial with said tip.

In Figs. 6–10, inclusive, I have shown a torch having an angularly disposed head or tip and other features which adapt it for use with either high pressure gases, or low pressure gases such as carried in ordinary city gas mains.

In order to adapt the device for use with high and low pressure gases, I have provided one tube 19 for conveying the combustible gases to the tip; a separate tube 20 for conveying cutting oxygen to the tip; and a third tube 21 for conveying the oxygen which is mixed with said gases. It is to be understood, of course, that the flow of gases and the oxygen are controlled by separate valves, not shown.

Where low pressure gases are used, tube 21 terminates in a nozzle 22 having its discharge end closely adjacent the entrance to the passage 23, and, surrounding the nozzle 22 is a chamber 24 which communicates with the low pressure gas tube 19 through the chamber 25 and the passage 26. Thus, the oxygen discharged from the nozzle 22 under high pressure and at high velocity, functions as an injector to force the low pressure gas into and through the passage 23, where it is mixed therewith, and into the annular chamber 27 from which the mixture passes through a multiplicity of passages 28", 28 and 28' (see Figs. 8, 9 and 10) to the discharge end of the tip. Since the passage 23 discharges into the annular chamber 27 at only one point, the chamber 27 must have sufficient depth or be of sufficient size to effect a substantially uniform distribution of the gas-oxygen mixture therein to flow through the circumferentially spaced passages 28".

In order to provide a satisfactory torch for cutting and scarfing heavy sections with gases at low pressure or having low B. t. u. content, or both, the torch must be so designed that large volumes of said gases can be burned at a high rate in a small space in order to produce the necessary heat. The injector in my torch effects the necessary delivery of large volumes of the gas to the zone of combustion, and the converging gas passages, the protecting sleeve, and the concave discharge end of the tip confine the combustion to a comparatively small zone where the heat is intense, thus effecting a quick melting start and a higher cutting speed.

One of the outstanding advantages of my torch arises from the fact that it may be used with gas at high or low pressure. Thus, if the torch is being used with high pressure gas, and the supply thereof fails during the operation, the torch may be immediately switched to a supply of gas at low pressure, which is always available in city mains, and the operation continued without substantial interruption. In other words, the torch illustrated in Fig. 7 may be used with gas at high as well as low pressure.

While I have illustrated my protector as applied only to a cutting or scarfing torch, it is to be understood that it may be applied to any type of torch if desired.

What I claim is:

1. A tip and shell protector for cutting, scarfing, and welding torches comprising a first sleeve formed of refractory material slidably mounted on said shell adjacent the end of said tip; a second sleeve formed of metal surrounding said first sleeve in a zone spaced from the forward end of said first sleeve; and a set screw extending through both of said sleeves securing said protector to said shell.

2. In a torch of the character described comprising a tip provided with an axial passage for the discharge of oxygen, a plurality of circumferentially spaced passages around said axial passage for the discharge of combustible gases, and a cylindrical shell laterally enclosing a passage for the flow of said gases to said plurality of passages but terminating short of the free end of said tip; a tip and shell protector comprising a sleeve formed of heat resisting material closely fitted around said shell and that portion of said tip between its free end and said shell, but longitudinally slidable on said shell and tip; whereby the distance which it extends beyond said tip may be adjusted; and means for securing it to said torch in adjusted position.

3. In a torch of the character described comprising a tip provided with an axial passage for the discharge of oxygen, a plurality of circumferentially spaced passages around said axial passage for the discharge of combustible gases, and a cylindrical shell laterally enclosing a passage for the flow of said gases to said plurality of passages but terminating short of the free end of said tip; means enclosing a chamber and a passage between said chamber and the passage enclosed by said shell and communicating with both; an injector nozzle in said chamber directed to discharge into said passage communicating therewith; a first tube adapted to convey oxygen to said nozzle; a second tube adapted to convey a combustible gas to said chamber to be injected into said passage communicating with said chamber by the oxygen discharged from said nozzle and mixed with said oxygen; a tip and shell protector comprising a sleeve formed of heat resisting material closely fitted around said shell and that portion of said tip between its free end and said shell, but longitudinally slidable on said shell and tip; whereby the distance which it extends beyond said tip may be adjusted; and means for securing it to said torch in adjusted position.

References Cited in the file of this patent

UNITED STATES PATENTS

| | | |
|---|---|---|
| 316,059 | Randol | Apr. 21, 1885 |
| 1,480,260 | Haas | Jan. 8, 1924 |
| 1,861,760 | Spigelmire | June 7, 1932 |
| 1,957,855 | States | May 8, 1934 |
| 2,376,413 | Babcock | May 22, 1945 |
| 2,404,590 | Nantz | July 23, 1946 |
| 2,622,668 | Buckle | Dec. 23, 1952 |

FOREIGN PATENTS

| | | |
|---|---|---|
| 17,320 | Great Britain | July 29, 1911 |